US009590902B2

(12) United States Patent
Lin et al.

(10) Patent No.: US 9,590,902 B2
(45) Date of Patent: Mar. 7, 2017

(54) SIGNALING ALIASING CAPABILITY IN DATA CENTERS

(71) Applicant: Juniper Networks, Inc., Sunnyvale, CA (US)

(72) Inventors: Wen Lin, Andover, MA (US); Vasudevan Venkatraman, Bangalore (IN); John E. Drake, Pittsburgh, PA (US)

(73) Assignee: Juniper Networks, Inc., Sunnyvale, CA (US)

( * ) Notice: Subject to any disclaimer, the term of this patent is extended or adjusted under 35 U.S.C. 154(b) by 201 days.

(21) Appl. No.: 14/585,841

(22) Filed: Dec. 30, 2014

(65) Prior Publication Data

US 2016/0134528 A1 May 12, 2016

(30) Foreign Application Priority Data

Nov. 10, 2014 (IN) .......................... 5642/CHE/2014

(51) Int. Cl.
*H04L 29/12* (2006.01)
*H04L 12/46* (2006.01)
*H04L 12/721* (2013.01)
*H04L 12/715* (2013.01)
*H04L 12/723* (2013.01)
*G06F 11/00* (2006.01)

(52) U.S. Cl.
CPC .......... *H04L 45/66* (2013.01); *H04L 12/4641* (2013.01); *H04L 45/04* (2013.01); *H04L 45/50* (2013.01)

(58) Field of Classification Search
USPC ........................................ 709/238, 226, 228
See application file for complete search history.

(56) References Cited

U.S. PATENT DOCUMENTS 7,185,067 B1 * 2/2007 Viswanath ............ H04W 28/08
455/453
8,310,957 B1 * 11/2012 Rekhter .............. H04L 12/4641
370/256

(Continued)

OTHER PUBLICATIONS

Sajassi et al., "A Network Virtualization Overlay Solution using EVPN," L2VPN Workgroup, draft-sd-l2vpn-evpn-overlay-03, Jun. 18, 2014, 24 pp.

(Continued)

*Primary Examiner* — Jude Jean Gilles
(74) *Attorney, Agent, or Firm* — Shumaker & Sieffert, P.A.

(57) ABSTRACT

Techniques are described for signaling aliasing capability between routers in a multi-tenant data center that uses VPNs, such as Ethernet VPNs. In the multi-tenant data center, two or more PE routers may be connected to a CE router by a multi-homed L2 segment in an all-active mode. Aliasing refers to the ability of a PE router to signal that it can reach a given multi-homed L2 segment even when the PE router has learned no MAC addresses over that multi-homed L2 segment. The PE routers on the multi-homed L2 segment advertise aliasing capability using a route advertisement on a per-L2 segment basis. When the multi-tenant data center uses global VPN identifiers, no additional information is needed by a remote PE to build an ECMP next hop to the PE routers that support aliasing, and transmission of a route advertisement on a per-VPN basis may be suppressed.

30 Claims, 5 Drawing Sheets

(56) References Cited

U.S. PATENT DOCUMENTS

| | | | | |
|---|---|---|---|---|
| 9,019,814 | B1* | 4/2015 | Mohanty | H04L 45/00 370/219 |
| 9,397,931 | B1* | 7/2016 | Mohanty | H04L 45/28 |
| 2013/0086280 | A1* | 4/2013 | James | H04L 45/10 709/238 |
| 2016/0134526 | A1* | 5/2016 | Maino | H04L 45/505 709/226 |

OTHER PUBLICATIONS

Sajassi et al.,"Requirements for Ethernet VPN (EVPN); Network Working Group Internet Draft, draft-ietf-l2vpn-evpn-req-07.txt," IETF Trust, Feb. 4, 2014, 16 pp.

Rabadan et al., "Usage and Applicability of BGP MPLS based Ethernet VPN; Internet Draft, draft-rp-l2vpn-evpn-usage-03.txt," The Internet Society, IETF Trust, Oct. 14, 2014, 30 pp.

Diccochea, "Ethernet VPN (EVPN) and Provider Backbone Bridging-EVPN: Next Generation Solutions for MPLS-based Ethernet Services," retrieved from http://www.cisco.comjcjenjusjproducts/collateraljroutersjasr-9000-series aggregation-services-routersjwhitepaper c11-731864.pdf, Jun. 3, 2014, 10 pp.

Sajassi et al., "BGP MPLS Based Ethernet VPN," Network Working Group Internet Draft, draft-ietf-l2vpn-evpn-11.txt11, IETF Trust, Oct. 17, 2014, 52 pp.

Extended Search Report from counterpart European Application No. 15193894.1, dated Mar. 10, 2016, 10 pp.

Response to Extended Search Report dated Mar. 10, 2016, from counterpart European Application No. 15193894.1, filed Nov. 11, 2016, 18 pp.

* cited by examiner

SIGNALING ALIASING CAPABILITY IN DATA CENTERS

This application claims the benefit of India Patent Application No. 5642/CHE/2014, filed Nov. 10, 2014, the entire content of which is incorporated herein by reference.

TECHNICAL FIELD

The invention relates to computer networks and, more specifically, to forwarding multicast traffic within data centers.

BACKGROUND

A data center is a specialized facility that provides data serving and backup as well as other network-based services for subscribers and other entities. A data center in its most simple form may consist of a single facility that hosts all of the infrastructure equipment, such as networking and storage systems, servers, redundant power supplies, and environmental controls.

More sophisticated data centers may be provisioned for geographically dispersed organizations using subscriber support equipment located in various physical hosting facilities (i.e., sites). In some cases, each of these sites may include switches, servers, storage area networks (SANs) or other equipment configured to operate as one portion of a single data center. In other cases, each of these sites may be configured to operate as a single data center itself. In either case, techniques have been developed to connect two more of the sites to form a single, logical multi-tenant data center. For example, a multi-tenant data center may be formed using Ethernet virtual private networks (EVPNs) as Network Virtualization Overlay (NVO) instances over an Internet Protocol (IP) underlay network. This may be especially useful in cases were the multi-tenant data center includes virtual hosts, e.g., virtual machines (VMs).

SUMMARY

In general, techniques are described for signaling aliasing capability between routers in a multi-tenant data center that uses layer two (L2) virtual private networks (VPNs), such as Ethernet Virtual Private Networks (EVPNs). In the multi-tenant data center, two or more provider edge (PE) routers may be connected to a customer edge (CE) router by a multi-homed L2 network segment, e.g., a multi-homed Ethernet segment (ES), in an all-active mode. In this arrangement, less than all of the PE routers on the multi-homed L2 network segment may, in some cases, learn a set of L2 addresses, e.g., media access control (MAC) addresses, associated with the CE router. In such situations, each of the PE routers that did not learn the set of MAC addresses associated with the CE router may nevertheless signal that it can reach a given multi-homed L2 network segment, referred to as "aliasing," with respect to the L2 addresses. According to the techniques of this disclosure, the PE routers on the multi-homed L2 network segment utilize an enhanced routing protocol that allows the PE routers to signal aliasing capability on an L2 network segment basis (e.g., per ES). In addition, in some examples in which a global VPN identifier is used, each of the PE routers on the multi-homed L2 network segment may suppress transmission of an additional route advertisement on a per-VPN basis (e.g., per-EVI).

As an example, the PE routers of a multi-homed ES may, according to the techniques described herein, advertise aliasing capability using a per-ES auto-discovery (AD) route advertisement that includes an Ethernet Segment Identifier (ESI) Label Extended Community with an aliasing bit. In cases where the multi-tenant data center uses globally unique Virtual Network Identifiers (VNIs) for EVPN instances (EVIs), no additional information is needed by a remote PE to build an equal-cost multi-path (ECMP) next hop to the PE routers on the multi-homed ES that support aliasing, and transmission of a per-EVI route advertisement may be suppressed.

In one example, this disclosure is directed to a method comprising establishing, between a first site and a second site of a multi-tenant data center, an Ethernet virtual private network (EVPN) including two or more provider edge (PE) routers connected to a customer edge (CE) router of the first site on a multi-homed Ethernet segment (ES) in an all-active mode, and at least one remote PE router; receiving, by a first PE router of the two or more PE routers on the multi-homed ES from the CE router, a packet with a media access control (MAC) address associated with the CE router; sending, by the first PE router to the at least one remote PE router, a MAC route advertisement including the MAC address associated with the CE router; and sending, by at least a second PE router of the two or more PE routers on the multi-homed ES to the at least one remote PE router, a per-ES auto-discovery (AD) route advertisement indicating whether the second PE router supports aliasing for the multi-homed ES.

In another example, this disclosure is directed to a system comprising two or more provider edge (PE) routers included in an Ethernet virtual private network (EVPN) established between a first site and a second site of a multi-tenant data center, the two or more PE routers connected to a customer edge (CE) router of the first site on a multi-homed Ethernet segment (ES) in an all-active mode; a first PE router of the two or more PE routers on the multi-homed ES configured to receive, from the CE router, a packet with a media access control (MAC) address associated with the CE router, and send, to at least one remote PE router included in the EVPN, a MAC route advertisement including the MAC address associated with the CE router; and a second PE router of the two or more PE routers on the multi-homed ES configured to send, to the at least one remote PE router, a per-ES auto-discovery (AD) route advertisement indicating whether the second PE router supports aliasing for the multi-homed ES.

In a further example, this disclosure is directed to a method comprising establishing, between a first site and a second site of a multi-tenant data center, an Ethernet virtual private network (EVPN) including two or more provider edge (PE) routers connected to a customer edge (CE) router of the first site on a multi-homed Ethernet segment (ES) in an all-active mode, and at least one remote PE router; receiving, by the remote PE router from a first PE router of the two or more PE routers on the multi-homed ES, a media access control (MAC) route advertisement including a MAC address associated with the CE router; receiving, by the remote PE router from at least a second PE router of the two or more PE routers on the multi-homed ES, a per-ES auto-discovery (AD) route advertisement indicating whether the second PE router supports aliasing for the multi-homed ES; and based on the per-ES AD route advertisement indicating that the second PE router supports aliasing for the multi-homed ES, building, by the remote PE router, an equal-cost multi-path (ECMP) next hop to at least the first and second PE routers on the multi-homed ES to reach the MAC address associated with the CE router over the multi-homed ES.

In an additional example, this disclosure is directed to a router comprising a routing engine configured to establish an Ethernet virtual private network (EVPN) between a first site and a second site of a multi-tenant data center, the EVPN including two or more provider edge (PE) routers connected to a customer edge (CE) router of the first site on a multi-homed Ethernet segment (ES) in an all-active mode, wherein the router is a remote PE router included in the EVPN, receive, from a first PE router of the two or more PE routers on the multi-homed ES, a media access control (MAC) route advertisement including a MAC address associated with the CE router, receive, from at least a second PE router of the two or more PE routers on the multi-homed ES, a per-ES auto-discovery (AD) route advertisement indicating whether the second PE router supports aliasing for the multi-homed ES, and based on the per-ES AD route advertisement indicating that the second PE supports aliasing for the multi-homed ES, build an equal-cost multi-path (ECMP) next hop to at least the first and second PE routers on the multi-homed ES to reach the MAC address associated with the CE router over the multi-homed ES. The router further comprises a forwarding engine configured to forward data packets destined for the MAC address associated with the CE router according to the ECMP next hop.

In another example, this disclosure is directed to a method comprising establishing, between a first site and a second site of a multi-tenant data center, a layer two virtual private network (L2 VPN) between two or more provider edge (PE) routers and at least one remote PE router, wherein the two or more PE routers are connected to a customer edge (CE) router of the first site by a multi-homed L2 network segment associated with a particular customer, and wherein the two or more PE routers are configured to operate in an all-active mode in which all of the PE routers forward L2 traffic from the at least one remote PE to the CE router over the multi-homed L2 network segment; receiving, by a first PE router of the two or more PE routers and from the CE router, a packet with an L2 address associated with the CE router; sending, by the first PE router to the at least one remote PE router, a route advertisement including the L2 address associated with the CE router; and sending, by at least a second PE router of the two or more PE routers to the at least one remote PE router using a routing protocol, an auto-discovery (AD) route advertisement associated with the multi-homed L2 network segment indicating whether the second PE router supports aliasing for the multi-homed L2 network segment to reach the L2 address associated with the CE router without having learned the L2 address over the multi-homed L2 network segment.

The details of one or more examples of the invention are set forth in the accompanying drawings and the description below. Other features, objects, and advantages of the invention will be apparent from the description and drawings, and from the claims.

DETAILED DESCRIPTION

Figure 1:
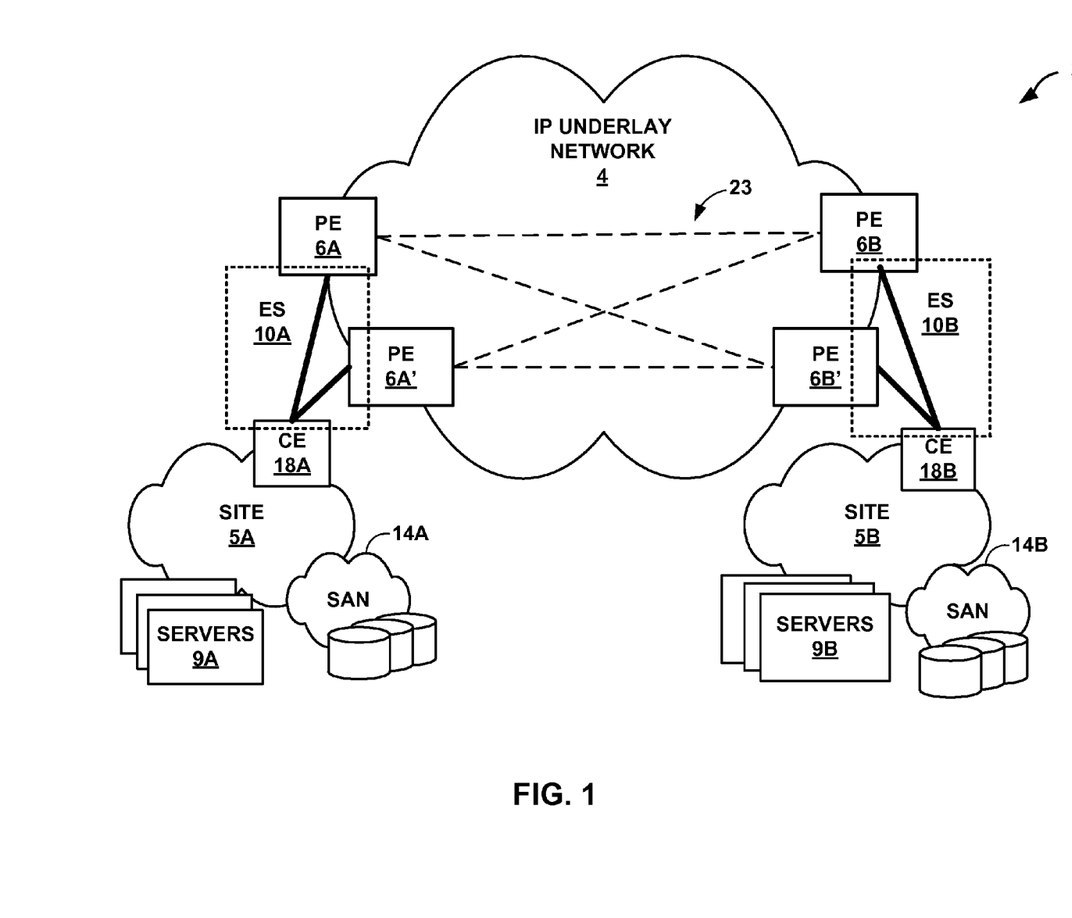
FIG. 1 is a block diagram illustrating an example multi-tenant data center using Ethernet virtual private network (EVPNs) in which provider edge (PE) routers on multi-homed Ethernet segments (ESs) signal aliasing capability according to the techniques of this disclosure.

FIG. 1 is a block diagram illustrating an example multi-tenant data center 2 using Ethernet virtual private network (EVPNs) in which provider edge (PE) routers on multi-homed Ethernet segments (ESs) signal aliasing capability according to the techniques of this disclosure. In the example of FIG. 1, data center sites 5A-5B (collectively, "sites 5") may each operate as a single data center itself or may each operate as a portion of a single data center. In either case, sites 5 are connected together to form single, logical multi-tenant data center 2. In other examples, a multi-tenant data center may include more than two sites.

Each of sites 5 are networks having specialized facilities that provide storage, management, and dissemination of data to subscribers and other entities. In the illustrated example of FIG. 1, each of sites 5A, 5B includes a plurality of servers 9A, 9B and storage area networks (SANs) 14A, 14B respectively that provide computing environments for subscribers/customers. Subscriber devices (not shown) may connect to sites 5 to request and receive services and data provided by sites 5 and multi-tenant data center 2 as a whole. In some instances, sites 5A, 5B may provide geographical redundancy against localized failure of one site of multi-tenant data center 2.

In the example of FIG. 1, sites 5 are interconnected by an EVPN 23 as a Network Virtualization Overlay (NVO) instance over an Internet Protocol (IP) underlay network 4. This configuration may be especially useful in cases were sites 5 of multi-tenant data center 2 include virtual hosts, e.g., virtual machines (VMs). In general, IP underlay network 4 represents a layer three (L3) network and may include multiple intermediate routing and switching devices (not shown) that transport data traffic over links between sites 5. As illustrated in FIG. 1, IP underlay network 4 includes provider edge (PE) routers 6A, 6A', 6B and 6B' (collectively, "PEs 6") that may establish EVPN 23 between sites 5A and 5B. In this way, PEs 6 establish EVPN 23 to transport layer two (L2) communications for customer networks of sites 5 over an intermediate network, e.g., IP underlay network 4, in a transparent manner, as if the intermediate network does not exist. In some examples, PEs 6 may establish EVPN 23 over IP underlay network 4 using the border gateway protocol (BGP). Although described with respect to EVPNs utilizing BGP, the techniques may be applied to other L2 VPNs and other routing protocols.

In one example, PEs 6 may establish EVPN 23 as an EVPN overlay with VXLAN encapsulation over IP underlay network 4. In this example, various customer networks provided within sites 5 may be virtually isolated onto different EVPNs and VXLANs. For example, each of sites 5 may run VXLANs to transport L2 communications for its customer networks. As an example, PEs 6A, 6A' may receive customer traffic from CE router 18A of site 5A and forward the traffic over IP network 4 via EVPN 23 as the EVPN overlay with VXLAN encapsulation, and may receive L2 communications from remote PEs 6B, 6B' via EVPN 23 as the EVPN overlay with VXLAN encapsulation and forward the L2 communications to CE router 18A for transport through site 5A over the VXLANs.

In other examples, PEs 6 may establish EVPN 23 as an EVPN overlay with Network Virtualization using Generic Routing Encapsulation (NVGRE) over IP underlay network 4, or may establish EVPN 23 as a Multi-Protocol Label Switching (MPLS) based EVPN over IP underlay network 4. Further example structural and functional details of an EVPN as a Virtual Network Overlay (NVO) over an IP underlay network are described in "A Network Virtualization Overlay Solution using EVPN," draft-sd-l2vpn-evpn-overlay-03.txt, Internet Engineering Task Force (IETF), Jun. 18, 2014, the entire contents of which are incorporated herein by reference.

As shown in FIG. 1, each site 5A, 5B is multi-homed to IP underlay network 4 for redundancy and load balancing. That is CE router 18A of site 5A is multi-homed to PE routers 6A, 6A' using a multi-homed Ethernet segment (ES) 10A in a single-active or an active-active/all-active mode. Similarly, CE router 18B of site 5B is multi-homed to PE routers 6B, 6B' using a multi-homed ES 10B in a single-active or an active-active/all-active mode. Each of the multi-homed ESs 10A, 10B may include a set of Ethernet links that operate as a link aggregation group (LAG). In other examples, CE routers 18 may each be multi-homed to more than two PE routers of IP underlay network 4.

As an example, when multi-homed ES 10A is operating in the all-active mode, traffic from CE router 18A may arrive at any of PE routers 6A, 6A' on multi-homed ES 10A and be forwarded accordingly via EVPN 23. Furthermore, traffic destined to CE router 18A may be received via EVPN 23 at any of the PE routers 6A, 6A' connected to multi-homed ES 10A. When forwarding L2 communications traversing EVPN 23, PE routers 6 learn L2 state information for the L2 customer networks within sites 5. The L2 state information may include media access control (MAC) addressing information associated with the network devices and customer equipment (e.g., virtual machines) within sites 5 and the ports and/or pseudowires of PE routers 6 through which the customer devices are reachable. The PE routers 6 typically store the MAC addressing information in L2 learning tables associated with each of their interfaces.

When multi-homed ES 10A is operating in the all-active mode, it is possible that only a first PE router (e.g., PE 6A) on multi-homed ES 10A learns a set of MAC addresses associated with traffic transmitted by CE router 18A. A remote PE router (e.g., PE 6B) may then receive MAC route advertisements for the set of MAC addresses from only the first PE router 6A. In this case, remote PE router 6B may not be able to effectively load balance traffic destined for the set of MAC addresses across all the PE routers 6A, 6A' on the multi-homed ES 10A.

Aliasing refers to the ability of a PE router to signal that it can reach a given multi-homed ES in a given EVPN instance (EVI) even when the PE router has learned no MAC addresses from that EVI/ES. In the illustrated example of FIG. 1, if second PE router 6A' supports aliasing for multi-homed ES 10A, second PE router 6A' may signal its aliasing capability to, for example, remote PE router 6B. In this way, second PE router 6A' indicates to remote PE router 6B that second PE router 6A' can be used to reach multi-homed ES 10A, and in turn reach the set of MAC addresses associated with CE router 18A, even though second PE router 6A' has not itself learned the set of MAC addresses over multi-homed ES 10A.

Conventionally, each of the PE routers on a multi-homed ES sends a per-ES auto-discovery (AD) route advertisement to signal whether the multi-homed ES is operating in a single-active mode or an all-active/active-active mode. More specifically, the per-ES AD route may be advertised with an Ethernet segment identifier (ESI) Label Extended Community including a flag, e.g., a "Single-Active" flag, that when set to 1 indicates that the multi-homed ES is in the single-active mode and when reset to 0 indicates that the multi-homed ES is the all-active mode. To signal aliasing capability, each of the PE routers also sends a per-EVI AD route advertisement that indicates whether the respective PE router supports aliasing capability and includes additional information needed by a remote PE to build an equal-cost multi-path (ECMP) next hop to the PE routers on the multi-homed ES.

In the case of MPLS based EVPN, each of the PE routers on a multi-homed ES may advertise a per-ES AD route and a per-EVI AD route. In this way, when a remote PE router learns a MAC address over a non-reserved multi-homed ES, the remote PE router may consider the multi-homed ES to be reachable via a given PE router only if the remote PE router receives from the given PE router a per-EVI AD route and a per-ES AD route indicating that the multi-homed ES is in the all-active mode. In this case, the per-EVI AD route carries an MPLS aliasing label as the additional information needed by the remote PE router to build an ECMP next hop to the PE router on the multi-homed ES.

As an example, consider a CE1 that is dual-homed to two PEs (e.g., PE1 and PE2) on a LAG interface (e.g., ES1), and is sending packets with a source MAC address MAC1 on a VLAN1, which is mapped to an EVI1. In the MPLS EVPN, if MAC1 is advertised only by PE1, a remote PE (e.g., PE3) considers MAC1 as being reachable via PE1 and PE2 only when PE1 and PE2 each advertise a per-ES AD route for ES1 as well as a per-EVI AD route for EVI1. An MPLS aliasing label included in the per-EVI AD route may be allocated for each of the advertising PE routers at different granularities (e.g., per-ES or per-EVI). On remote PE3, the MPLS label in the MAC route advertised by PE1 is used to build an ECMP next hop to PE1 to reach MAC1 over ES1, while the aliasing label advertised in the per-EVI AD route from PE2 is used to build the ECMP next hop to PE2 to reach MAC1 over ES1.

In the case of an EVPN overlay with VXLAN encapsulation when the VNI for the EVPN has a local scope, each of the PE routers on a multi-homed ES may advertise a per-ES AD route and a per-EVI AD route. In this case, the per-EVI AD route carries the local VNI as the additional information needed by a remote PE router to build an ECMP next hop to the PE router on the multi-homed ES. In the case of an EVPN overlay with VXLAN encapsulation when the VNI for the EVPN has a global scope, each of the PE routers on a multi-homed ES may again advertise a per-ES AD route and a per-EVI AD route. In this case, however, the per-EVI AD route will not carry any additional information needed by a remote PE router to build an ECMP next hop to the PE router. This is because the remote PE router uses the global VNI that is advertised with the MAC address by another PE router on the multi-homed ES to build the ECMP next hop to the aliasing PE router on the multi-homed ES.

Aliasing is an optional feature of the all-active mode for multi-homed ESs. In order to use the aliasing feature, advertisement of the per-EVI AD route is needed if there is additional information (e.g., an MPLS aliasing label or a local scope VNI) that must be conveyed to the remote PE router to build the ECMP next hop correctly. In an EVPN overlay with VXLAN encapsulation using a globally unique VNI, the per-EVI AD route is only used to indicate aliasing capability as no additional information is needed to correctly build the ECMP next hop.

According to the techniques of this disclosure, the aliasing capability may instead be signaled as part of the per-ES AD route advertisement. In one example, the techniques of this disclosure extend the ESI Label Extended Community advertised with the per-ES AD route to include an aliasing bit that, when set, indicates that aliasing is supported by the advertising PE router for a given multi-homed ES. In this way, for an EVPN overlay with VXLAN encapsulation using a globally unique VNI, advertisement of the per-EVI AD route is unnecessary, and the per-EVI AD route advertisement may be suppressed.

In the example of FIG. 1, PE routers 6A, 6A' on the multi-homed ES 10A advertise their aliasing capability using a per-ES AD route advertisement that includes the ESI Label Extended Community with the aliasing bit. In cases where multi-tenant data center 2 uses globally unique VNIs, the remote PE router 6B, for example, may using the global VNI to build an ECMP next hop to PE routers 6A, 6A' that support aliasing for multi-homed ES 10A. In this case, no additional information is needed by remote PE 6B to build the ECMP next hop to reach the set of MAC addresses learned over multi-homed ES 10A, and PE routers 6A, 6A' may suppress transmission of a per-EVI route advertisements.

Figure 2:
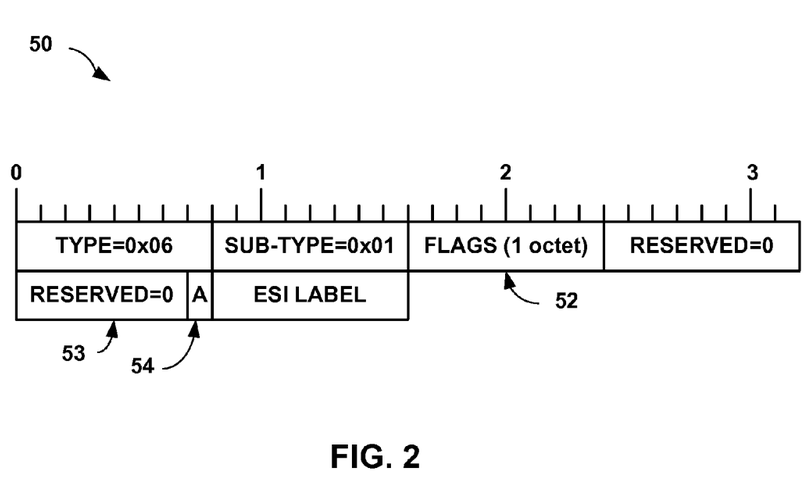
FIG. 2 is a conceptual diagram illustrating an example of an Ethernet Segment Identifier (ESI) Label Extended Community included with a per-ES auto-discovery (AD) route advertisement, in accordance with the techniques of this disclosure.

FIG. 2 illustrates an example of an ESI Label Extended Community 50 included with the per-ES AD route advertisement, in accordance with the techniques of this disclosure. The ESI Label Extended Community 50 includes a "Single-Active" flag, which may be included in flags field 52, to indicate wither a given multi-homed ES is operating in a single-active mode or an all-active mode. According to the techniques of this disclosure, aliasing capability may be signaled in the Reserved field 53 of the ESI Label Extended Community 50 advertised with the per-ES AD route. As illustrated in FIG. 2, the least significant bit in the Reserved field 53 is used for the purpose of signaling aliasing capability with an A-bit 54. When A-bit 54 is set, i.e., equal to 1, it indicates that an advertising PE router supports the aliasing function for the multi-homed ES. When A-bit 54 is reset, i.e., equal to 0, it indicates that the advertising PE router does not support the aliasing function for the multi-homed ES. In the case of a EVPN overlay with VXLAN encapsulation using a globally unique VNI, a remote PE router may use the globally unique VNI label to correctly build an ECMP next hop to the advertising PE router on the given multi-homed ES in order to reach a MAC address learned over the multi-homed ES.

Returning to the example of FIG. 1 in which EVPN 23 is a EVPN overlay with VXLAN encapsulation using a globally unique VNI, CE 18A that is dual-homed to two PEs (i.e., PE 6A and PE 6A') on a LAG interface (i.e., ES 10A), and is sending packets with a source MAC address MAC1 on a VLAN1, which is mapped to an EVI1. In accordance with the techniques of this disclosure, if MAC1 associated with CE 18A is advertised only by PE 6A in a MAC route advertisement, a remote PE (e.g., PE 6B) considers MAC1 as being reachable via PE 6A and PE 6A' when PE 6B learns MAC1 from PE 6A and receives a per-ES AD route for multi-homed ES 10A from PE 6A' with the "Single-Active" flag reset to indicate that multi-homed ES 10A is in the all-active mode and the A-bit set to indicate that PE 6A' supports aliasing for multi-homed ES 10A.

At remote PE 6B, the globally unique VNI included in the MAC route advertised by PE 6A is used to build the ECMP next hop to PE 6A and PE 6A' to reach MAC1 over multi-homed ES 10A. Since the VNI is a globally unique value, PE 6B may use the same VNI value to build the ECMP next hop to reach multiple PE routers on multi-homed ES1 10A. In this way, remote PE 6B may use the global VNI from the MAC route advertised by PE 6A to build the ECMP next hop to reach MAC1 over multi-homed ES 10A, and then may add an additional next hop to PE 6A' that supports aliasing for multi-homed ES 10A to the ECMP next hop to reach MAC1 over multi-homed ES 10A. In other examples in which more than two PE routers are connected to multi-homed ES 10A, PE 6B may use the globally unique VNI label to build an ECMP next hop to any of the PE routers that signal their support of aliasing for multi-homed ES 10A.

If PE 6A' subsequently sends a per-ES AD route advertisement update with the A-bit reset (i.e., equal to 0) to indicate that PE 6A' no longer supports aliasing for multi-homed ES 10A, PE 6B may handle the route update the same way as a per-EVI AD route withdrawal. In other words, PE 6B may remove PE 6A' from the ECMP next hop for the MACs learned over multi-homed ES 10A, e.g., the ECMP next hop for MAC1. In the case of a EVPN overlay with VXLAN encapsulation using a globally unique VNI, if PE 6B receives a per-EVI AD route from PE 6A' after receiving the per-ES AD route with the A-bit set from PE 6A', it may be considered non-operational (i.e., a no-op), as would a per-EVI AD route withdrawal received from PE 6A'. In the above case, PE 6B may discard the per-EVI AD route or per-EVI AD route withdrawal received from PE 6A'.

In general, this disclosure describes techniques that apply to EVPN 23 as an EVPN overlay using VXLAN encapsulation when VNI has global scope. In this case, MPLS may not be running in IP underlay network 4, and the advertisement of a per-EVI AD route may be suppressed by PE routers 6 connected to multi-homed ESs 10. According to the techniques of this disclosure, aliasing capability is instead advertised through an A-bit in an ESI Label Extended Community included with a per-ES AD route. The suppressing of the per-EVI AD route for signaling aliasing capability does not apply to the case where EVPN 23 is an EVPN overlay using VXLAN encapsulation when VNI has local scope, or where EVPN 23 is a MPLS based EVPN running over IP underlay network 4. In these cases, PE routers 6 of multi-homed ESs 10 may send per-EVI AD route advertisements including the additional information, e.g., the local VNI or a MPLS aliasing label, needed to build the ECMP.

In order to support the aliasing function, one or more of the following four features may be used in any combination. First, the PE routers on the multi-homed ES advertise their aliasing capability using per-ES AD routes with the A-bit in the ESI Label Extended Community. This feature applies to the EVPN overlay with VXLAN encapsulation. In some examples, this feature may also apply to the MPLS based EVPN.

Second, information for the remote PE to build the ECMP next hop to the MAC addresses learned over the multi-homed ES may be signaled to the remote PE. For the EVPN overlay with VXLAN encapsulation when VNI has a global scope, no additional information is needed. In this case, the remote PE can use the global VNI advertised in the MAC route by a first PE on the multi-homed ES in order to build the ECMP next hop to multiple PEs on the multi-homed ES. For the MPLS EVPN or the EVPN overlay with VXLAN encapsulation when VNI has a local scope, additional information, such as the MPLS aliasing label or a local scope VNI, is needed to build the ECMP next hop. When additional information is needed to build the ECMP next-hop, the additional information is still conveyed through a per-EVI AD route advertisement.

Third, by separating the aliasing capability signaling into a per-ES AD route and any additional information needed to build the ECMP next hop into a per-EVI AD route for the aliasing function, the per-EVI AD route can be suppressed when no additional information is needed to build the ECMP next hop. For example, in case of the EVPN overlay with VXLAN encapsulation when VNI has a global scope, no additional information is needed and only the per-ES AD route is advertised to signal aliasing capability. Fourth, to make the described techniques backward compatible, the aliasing capability may be signaled using either the A-bit in the ESI Label Extended Community included in the per-ES AD route, or an explicit advertisement of a per-EVI AD route.

The techniques of this disclosure may enable PE routers 6 to load balance L2 traffic to multi-homed CE routers 18 faster than in conventional techniques. In this way, the techniques may provide for less traffic loss due to the more efficient routing of L2 traffic.

Figure 3:
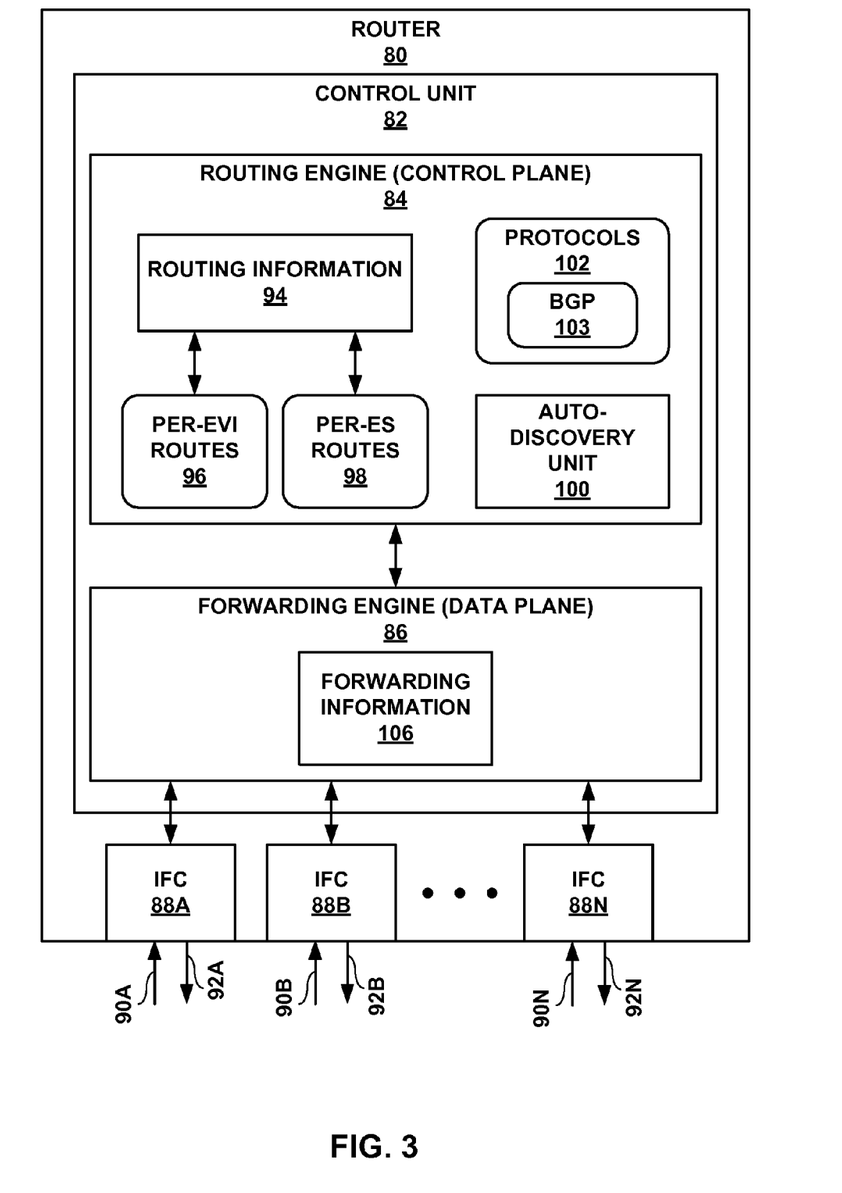
FIG. 3 is a block diagram illustrating an example router capable of performing the disclosed techniques.

FIG. 3 is a block diagram illustrating an example router 80 capable of performing the disclosed techniques. In general, router 80 may operate substantially similar to any of PEs 6 of FIG. 1. In the illustrated example of FIG. 3, router 80 includes interface cards 88A-88N ("IFCs 88") that receive packets via incoming links 90A-90N ("incoming links 90") and send packets via outbound links 92A-92N ("outbound links 92"). IFCs 88 are typically coupled to links 90, 92 via a number of interface ports. Router 80 also includes a control unit 82 that determines routes of received packets and forwards the packets accordingly via IFCs 88.

Control unit 82 may comprise a routing engine 84 and a forwarding engine 86. Routing engine 84 operates as the control plane for router 80 and includes an operating system that provides a multi-tasking operating environment for execution of a number of concurrent processes. Routing engine 84 may implement one or more protocol 102 to execute routing processes. For example, routing protocols 102 may include Border Gateway Protocol (BGP) 103 for exchanging routing information with other routing devices and for updating routing information 94. Routing information 94 may describe a topology of the computer network in which router 80 resides, and may also describe various routes within the network and the appropriate next hops for each route, i.e., the neighboring routing devices along each of the routes. Routing engine 84 analyzes stored routing information 94 and installs forwarding data structures into forwarding information 106 of forwarding engine 86.

Routing engine 84 also includes an auto-discovery (AD) unit 100 that may use BGP 103 to both advertise AD routes to the neighboring routing devices and discover or learn AD routes advertised by the neighboring routing devices. In the example illustrated in FIG. 3, routing information 94 may include per-EVI routes 96 and per-ES routes 98. When router 80 is one of two or more PE routers on a multi-homed ES in a given EVI, AD unit 100 may advertise per-EVI routes 98 and/or per-ES routes 98. When router 80 is a remote router in a given EVI, AD unit 100 may receive per-EVI routes 98 and/or per-ES routes 98 advertised by two or more PE routers on a multi-homed ES in the given EVI.

Forwarding engine 86 operates as the data plane for router 80 for forwarding network traffic. In some examples, forwarding engine 86 may comprise one or more packet forwarding engines (PFEs) (not shown) that may each comprise a central processing unit (CPU), memory and one or more programmable packet-forwarding application-specific integrated circuits (ASICs). Forwarding information 106 may associate, for example, network destinations with specific next hops and corresponding interface ports of IFCs 88. Forwarding information 106 may be a radix tree programmed into dedicated forwarding chips, a series of tables, a complex database, a link list, a radix tree, a database, a flat file, or various other data structures.

According to techniques of this disclosure, routing engine 84 may use BGP 103 to establish an EVPN as an NVO instance over an underlay network, e.g., EVPN 23 over IP underlay network 4 from FIG. 1, between a first site and a second site of a multi-tenant data center. The EVPN may include two or more PE routers connected to a CE router on a multi-homed ES in an all-active mode, and at least one remote PE router. Router 80 may comprise any of the two or more PE routers on the multi-homed ES, e.g., PEs 6A, 6A' from FIG. 1, or the at least one remote PE router, e.g., PE 6B from FIG. 1.

As a first PE router of the two or more PE routers on the multi-homed ES, router 80 may receive a packet with a MAC address associated with the CE router, and use BGP 103 to send, to the remote PE router, a MAC route advertisement including the MAC address of the CE router. As a second PE router of the two or more PE routers on the multi-homed ES, router 80 may use AD unit 100 and BGP 103 to advertise, to the remote PE router, a per-ES AD route 98 indicating whether router 80 supports aliasing for the multi-homed ES. In some examples, the first PE router advertising the MAC route may also advertise a per-ES AD route 98 indicating its aliasing capability. In other examples, each of the two or more PE routers on the multi-homed ES may advertise a per-ES AD route 98 indicating its aliasing capability.

As a remote PE router, router 80 may use BGP 103 to receive, from a first PE router of the two or more PE routers on the multi-homed ES, a MAC route advertisement including a MAC address for the CE router. In addition, AD unit 100 of routing engine 84 may use BGP 103 to receive, from at least a second PE router of the two or more PE routers on the multi-homed ES, a per-ES AD route 98 indicating whether the second PE router supports aliasing for the multi-homed ES. Based on the per-ES AD route advertisement indicating that the second PE router supports aliasing for the multi-homed ES, routing engine 84 may use routing information 94 to build an ECMP next hop in forwarding information 106 to at least the first and second PE routers of the two or more PE routers on the multi-homed ES to reach the MAC address of the CE router over the multi-homed ES. In other examples, router 80 may build the ECMP next hop in forwarding information 106 to any of the two or more PE routers on the multi-homed ES that advertise support of the aliasing capability in a per-ES AD route.

According to the techniques of this disclosure, one or more of the per-ES AD routes 98 may include an ESI Label Extended Community with an aliasing bit, where the aliasing bit being set (e.g., equal to 1) indicates that the advertising PE router supports aliasing for the multi-homed ES, and the aliasing bit being reset (e.g., equal to 0) indicates that the advertising PE router does not support aliasing for the multi-homed ES. The aliasing bit may comprises a least significant bit in a Reserved field in the ESI Label Extended Community advertised with the per-ES AD route, as illustrated in FIG. 2. The ESI Label Extended Community also includes a flag indicating whether the multi-homed ES is in the all-active mode. Based on the flag indicating that the multi-homed ES is in the all-active mode and based on the aliasing bit being set, the ESI Label Extended Community advertised with the per-ES AD route indicates to router 80 operating as the remote PE router that the MAC address of the CE router is reachable via both the first PE router advertising the MAC route and the second PE router advertising aliasing capability for the multi-homed ES over which the MAC address was learned.

In an example of an EVPN overlay with VXLAN encapsulation when the VNI has a global scope, router 80 operating as the remote PE router may build the ECMP next hop to at least the first and second PE routers on the multi-homed ES using the globally unique VNI included in the MAC route advertised by the first PE router in order to reach the MAC address of the CE router over the multi-homed ES. In this way, router 80 operating as the remote PE router of the EVPN may build the ECMP next hop by adding a next hop to the first PE router advertising the MAC route, and adding another next hop to each of the other PE routers on the multi-homed ES advertising per-ES AD routes with the A-bit set in the ESI Label Extended Community.

If, after receiving the per-ES AD route advertisement indicating that aliasing is supported for the multi-homed ES, router 80 operating as the remote PE router receives, from the second PE router on the multi-homed ES, a per-ES AD route advertisement update with the aliasing bit reset to indicate that the second PE router no longer supports aliasing for the multi-homed ES, router 80 may withdraw the second one of the two or more PE routers from the ECMP next hop in forwarding information 106 for the MAC address of the CE router.

In another example of an EVPN overlay with VXLAN encapsulation when the VNI has a local scope or a MPLS based EVPN, router 80 operating as one of the two or more PE routers on the multi-homed ES may advertise its aliasing capability using a per-ES AD route 98 including the ESI Label Extended Community with the aliasing bit, and then advertise additional information, e.g., the local VNI or a MPLS aliasing label, in a per-EVI AD route 96. In this example, since no global identifier is used, router 80 operating as the remote PE router may build the ECMP next hop to any of the PE routers that support aliasing for the multi-homed ES using local VNI or the MPLS aliasing label included in the per-EVI AD routes 96 in order to reach the MAC address of the CE router over the multi-homed ES.

In yet another example of an EVPN overlay with VXLAN encapsulation when the VNI has a local scope or as a MPLS based EVPN, in order to be fully backward compatible, router 80 operating as one of the two or more PE routers on the multi-homed ES may advertise its aliasing capability and the additional information needed to build the ECMP next hop using a per-EVI AD route 96.

The architecture of router 80 illustrated in FIG. 3 is shown for exemplary purposes only. The techniques of this disclosure are not limited to this architecture. In other examples, router 80 may be configured in a variety of ways. In one example, some of the functionally of control unit 82 may be distributed within IFCs 88 or a plurality of packet forwarding engines (PFEs) (not shown). Control unit 82 may be implemented solely in software, or hardware, or may be implemented as a combination of software, hardware, or firmware. For example, control unit 82 may include one or more processors which execute software instructions. In that case, the various software modules of control unit 82 may comprise executable instructions stored on a computer-readable medium, such as computer memory or hard disk.

Figure 4:
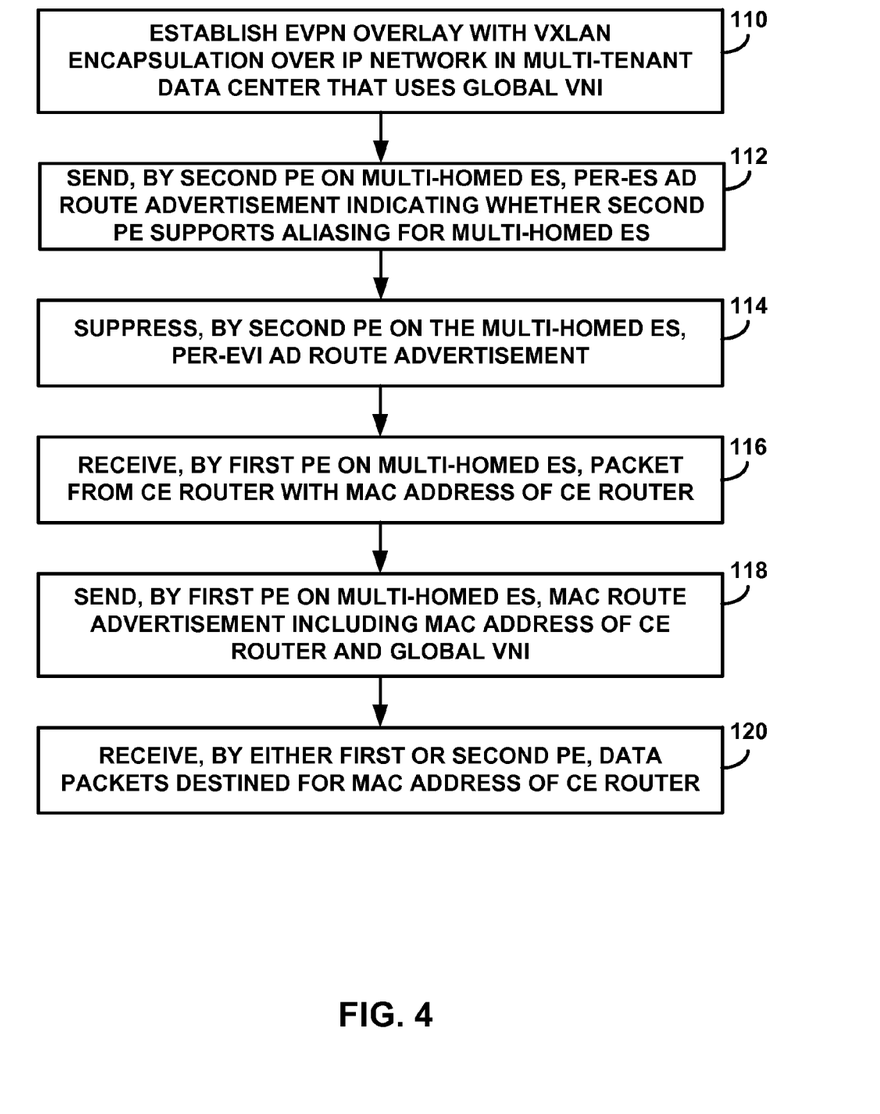
FIG. 4 is a flowchart illustrating an example operation of PE routers on a multi-homed ES signaling aliasing capability to a remote PE in a multi-tenant data center using EVPNs.

FIG. 4 is a flowchart illustrating an example operation of PE routers on a multi-homed ES signaling aliasing capability to a remote PE in a multi-tenant data center using EVPNs. The operation of FIG. 4 is described with respect to first PE 6A and second PE 6A' on multi-homed ES 10A, and remote PE 6B from FIG. 1. Although the operation of FIG. 4 is described as being performed by only two PE routers on a multi-homed ES, a similar operation may be performed by more than two PE routers on a multi-homed ES. In other examples, the operation of FIG. 4 may be performed by PE 6B and PE 6B' on multi-homed ES 10B from FIG. 1, or may be performed by router 80 of FIG. 3 operating as one of the PE routers on a multi-homed ES.

First PE 6A and second PE 6A' may communicate with one or more of remote PE 6B and remote PE 6B' to establish EVPN 23 as an EVPN overlay with VXLAN encapsulation over IP network 4 in multi-tenant data center 2 that uses a global VNI (110). First PE 6A and second PE 6A' connect to CE 18A of first site 5A of multi-tenant data center 2 via multi-homed ES1 10A in an all-active mode.

According to the techniques of this disclosure, at least second PE 6A' sends a per-ES AD route advertisement indicating whether second PE 6A' supports aliasing for multi-homed ES 10A to, e.g., remote PE 6B (112). The per-ES AD route advertisement sent by second PE 6A' includes an ESI Label Extended Community with an aliasing bit (i.e., an A-bit). When the A-bit is set (e.g., equal to 1), it indicates that second PE 6A' supports aliasing for the multi-homed ES 10A, and when the A-bit is reset (e.g., equal to 0), it indicates that second PE 6A' does not support aliasing for the multi-homed ES 10A. In the example where the A-bit is set, second PE 6A' indicates to remote PE 6B that second PE 6A' can be used to reach multi-homed ES 10A, and in turn reach MAC addresses over multi-homed ES 10A, even though second PE 6A' has not itself learned the MAC addresses over multi-homed ES 10A.

Although this disclosure primary describes the per-ES AD route advertisement including the ESI Label Extended Community with the aliasing bit being sent only by second PE 6A', the techniques of this disclosure are not so limited. In some examples, each of first PE 6A and second PE 6A' may send a per-ES AD route advertisement including the ESI Label Extended Community with the aliasing bit to indicate whether the respective one of first PE 6A and second PE 6A' supports aliasing for multi-homed ES 10A. In other examples in which more than two PE routers are included in a multi-homed ES, each of the two or more PE routers on the multi-homed ES may send a per-ES AD route advertisement including the ESI Label Extended Community with the aliasing bit to indicate whether the respective PE router supports aliasing for the multi-homed ES.

In the example of EVPN 23 as an EVPN overlay with VXLAN encapsulation when the VNI has a global scope, second PE 6A' may signal its aliasing capability to remote PE 6B using only the per-ES AD route advertisement including the ESI Label Extended Community with the aliasing bit, and suppress transmission of a per-EVI AD route advertisement (114). In this example, the additional information typically included in the per-EVI AD route advertisement, e.g., a local VNI or MPLS aliasing label, is not needed by remote PE 6B to build an ECMP next hop to reach MAC addresses over multi-homed ES 10A. Instead, remote PE 6B may use the global VNI included in a MAC route advertisement from another PE router, e.g., first PE 6A, on multi-homed ES 10A to build an ECMP next hop to both first PE 6A and second PE 6A' to reach the MAC addresses over multi-homed ES 10A.

After multi-homed ES 10A is configured, first PE 6A on multi-homed ES 10A receives a packet from CE 18A that includes a MAC address of CE 18A (116). In response to receiving the packet, first PE 6A sends a MAC route advertisement including the MAC address of CE 18A and the global VNI to, e.g., remote PE 6B (118). Either first PE 6A or second PE 6A' may receive data packets destined for the MAC address of the CE router (120). In this case, the data packets may be received from remote PE 6B according to the ECMP next hop built using the global VNI. In other examples in which more than two PE routers are included in a multi-homed ES, any of the two or more PE routers that indicated support of the aliasing capability for the multi-homed ES may receive data packets destined for the MAC addresses learned over the multi-homed ES.

In the example of EVPN 23 as an EVPN overlay with VXLAN encapsulation when the VNI has a local scope or as a MPLS based EVPN, second PE 6A' may still signal its aliasing capability to remote PE 6B using the per-ES AD route advertisement including the ESI Label Extended Community with the aliasing bit, and then send additional information, e.g., the local VNI or a MPLS aliasing label, to remote PE 6B in a per-EVI AD route advertisement. In this example, since no global identifier is used, the additional information is needed by remote PE 6B to build an ECMP next hop to both first PE 6A and second PE 6A' to reach the MAC address of CE 18A over multi-homed ES 10A. In yet another example of EVPN 23 as an EVPN overlay with VXLAN encapsulation when the VNI has a local scope or as a MPLS based EVPN, in order to be fully backward compatible, second PE 6A' may signal its aliasing capability and the additional information needed to build the ECMP next hop to remote PE 6B using a per-EVI AD route advertisement.

Figure 5:
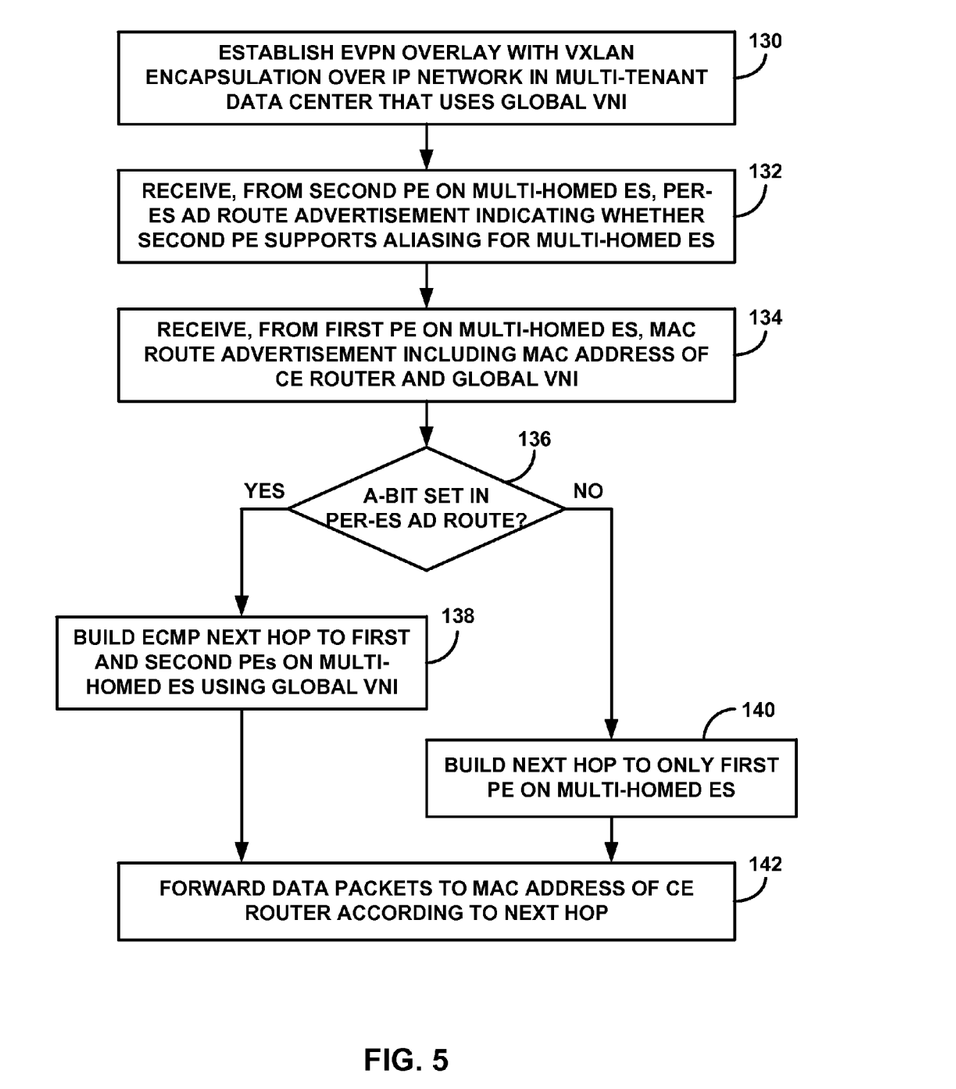
FIG. 5 is a flowchart illustrating an example operation of a remote PE router receiving aliasing capability signaling from PE routers on a multi-homed ES in a multi-tenant data center using EVPNs.

FIG. 5 is a flowchart illustrating an example operation of a remote PE router receiving aliasing capability signaling from PE routers on a multi-homed ES in a multi-tenant data center using EVPNs. The operation of FIG. 5 is described with respect to remote PE 6B, and first PE 6A and second PE 6A' on multi-homed ES 10A from FIG. 1. Although the operation of FIG. 4 is described as being performed by a remote PE with respect to only two PE routers on a multi-homed ES, a similar operation may be performed by a remote PE with respect to more than two PE routers on a multi-homed ES. In other examples, the operation of FIG. 5 may be performed by any of PE 6A, PE 6A' or PE 6B' from FIG. 1, or may be performed by router 80 of FIG. 3 operating as a remote PE router included in an EVPN.

Remote PE 6B may communicate with one or more of remote PE 6B', first PE 6A and second PE 6A' to establish EVPN 23 as an EVPN overlay with VXLAN encapsulation over IP network 4 in multi-tenant data center 2 that uses a global VNI (130). Remote PE 6B connects to first PE 6A and second PE 6A' via EVPN 23, and first PE 6A and second PE 6A' connect to CE 18A of first site 5A of multi-tenant data center 2 via multi-homed ES1 10A in an all-active mode.

According to the techniques of this disclosure, remote PE 6B receives a per-ES AD route advertisement from, e.g., second PE 6A', indicating whether second PE 6A' supports aliasing for multi-homed ES 10A (132). The per-ES AD route advertisement received from second PE 6A' includes an ESI Label Extended Community with an aliasing bit (i.e., an A-bit). When the A-bit is set (e.g., equal to 1), it indicates that second PE 6A' supports aliasing for the multi-homed ES 10A, and when the A-bit is reset (e.g., equal to 0), it indicates that second PE 6A' does not support aliasing for the multi-homed ES 10A. In the example where the A-bit is set, remote PE 6B learns that second PE 6A' can be used to reach multi-homed ES 10A, and in turn reach MAC addresses over multi-homed ES 10A, even though remote PE 6B has not received a MAC route advertisement for the MAC addresses from second PE 6A'.

Although this disclosure primary describes the per-ES AD route advertisement including the ESI Label Extended Community with the aliasing bit being received by remote PE 6B from only second PE 6A', the techniques of this disclosure are not so limited. In some examples, remote PE 6B may receive a per-ES AD route advertisement including the ESI Label Extended Community with the aliasing bit from each of first PE 6A and second PE 6A' indicating whether the respective one of first PE 6A and second PE 6A' supports aliasing for multi-homed ES 10A. In other examples in which more than two PE routers are included in a multi-homed ES, remote PE 6B may receive a per-ES AD route advertisement including the ESI Label Extended Community with the aliasing bit from each of the two or more PE routers on the multi-homed ES indicating whether the respective PE router supports aliasing for the multi-homed ES.

In the example of EVPN 23 as an EVPN overlay with VXLAN encapsulation when the VNI has a global scope, remote PE 6B may learn the aliasing capability of second PE 6A' based on only the per-ES AD route advertisement including the ESI Label Extended Community with the aliasing bit received from second PE 6A'. In this example, additional information typically included in per-EVI AD route advertisements, e.g., a local VNI or MPLS aliasing label, is not needed by remote PE 6B to build an ECMP next hop to reach the MAC addresses over multi-homed ES 10A. Instead, remote PE 6B may use the global VNI included in a MAC route advertisement from another PE router, e.g., first PE 6A, on multi-homed ES 10A to build an ECMP next hop for the MAC addresses.

After the multi-homed ES 10A is configured, remote PE 6B receives a MAC route advertisement from, e.g., first PE 6A on multi-homed ES 10A that including a MAC address of CE 18A and the global VNI (134). If the A-bit is set in the per-ES AD route advertisement received from second PE 6A' indicating that second PE 6A' supports aliasing for multi-homed ES 10A (YES branch of 136), remote PE 6B builds an ECMP next hop to first PE 6A and second PE 6A' on multi-homed ES 10A using the global VNI to reach the MAC address of CE 18A over multi-homed ES 10A (138). Remote PE 6B may then send data packets destined for the MAC address of the CE router to either first PE 6A or second PE 6A' according to the ECMP next hop for the MAC address of the CE router (142). If remote PE 6B subsequently receives from second PE 6A' a per-ES AD route advertisement update with the A-bit reset indicating that second PE 6A' no longer supports aliasing for multi-homed ES 10A, remote PE 6B may withdraw second PE 6A' from the ECMP next hop for the MAC address of CE 18A. In other examples in which more than two PE routers are included in a multi-homed ES, remote PE 6B may build an ECMP next hop to any of the two or more PE routers that indicated support of the aliasing capability for the multi-homed ES using the global VNI to reach a MAC address learned over the multi-homed ES.

If the A-bit is reset in the per-ES AD route advertisement received from second PE 6A' indicating that second PE 6A' does not support aliasing for multi-homed ES 10A (NO branch of 136), remote PE 6B builds a next hop only to first PE 6A based on the MAC route advertisement from first PE 6A to reach the MAC address of the CE router over multi-homed ES 10A (140). Remote PE 6B may then send data packets destined for the MAC address of the CE router to only first PE router 6A, i.e., the sender of the MAC route advertisement, according to the next hop for the MAC address of the CE router (142).

In the example of EVPN 23 as an EVPN overlay with VXLAN encapsulation when the VNI has a local scope or as a MPLS based EVPN, remote PE 6B may still learn the aliasing capability of second PE 6A' based on the per-ES AD route advertisement including the ESI Label Extended Community with the aliasing bit received from second PE 6A', and then learn additional information, e.g., the local VNI or a MPLS aliasing label, based on a per-EVI AD route advertisement also received from second PE 6A'. In this example, since no global identifier is used, remote PE 6B builds an ECMP next hop to first PE 6A and second PE 6A' on multi-homed ES 10A using either the local VNI or the MPLS aliasing label to reach the MAC address of CE 18A over multi-homed ES 10A. In yet another example of EVPN 23 as an EVPN overlay with VXLAN encapsulation when the VNI has a local scope or as a MPLS based EVPN, in order to be fully backward compatible, remote PE 6B may learn the aliasing capability of second PE 6A' and the additional information needed to build the ECMP next hop based on a per-EVI AD route advertisement received from second PE 6A'.

Although primary described above with respect to EVPNs utilizing BGP, and specifically to EVPN overlays with VXLAN encapsulation over IP underlay networks when VNI has a global scope, the techniques of this disclosure may be applied to other L2 VPNs and other routing protocols. For example, in a multi-tenant data center, two or more PE routers may be connected to a CE router by a multi-homed L2 network segment, e.g., a multi-homed ES, in an all-active mode. According to the techniques of this disclosure, the PE routers on the multi-homed L2 segment utilize an enhanced routing protocol that allows the PE routers to signal aliasing capability on an L2 segment basis (e.g., per-ES). In this way, each of the PE routers on the multi-homed L2 segment that did not learn a set of MAC addresses associated with the CE router may nevertheless signal that it can reach the given set of MAC addresses over the multi-homed L2 segment. In addition, in some examples in which a global VPN identifier is used, each of the PE routers on the multi-homed L2 segment may suppress transmission of an additional route advertisement on a per-VPN basis (e.g., per-EVI).

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments have been described. These and other embodiments are within the scope of the following examples.

What is claimed is:

1. A method comprising:
    establishing, between a first site and a second site of a multi-tenant data center, an Ethernet virtual private network (EVPN) including two or more provider edge (PE) routers connected to a customer edge (CE) router of the first site on a multi-homed Ethernet segment (ES) in an all-active mode, and at least one remote PE router;
    receiving, by a first PE router of the two or more PE routers on the multi-homed ES from the CE router, a packet with a media access control (MAC) address associated with the CE router;
    sending, by the first PE router to the at least one remote PE router, a MAC route advertisement including the MAC address associated with the CE router; and
    sending, by at least a second PE router of the two or more PE routers on the multi-homed ES to the at least one remote PE router, a per-ES auto-discovery (AD) route advertisement indicating whether the second PE router supports aliasing for the multi-homed ES.

2. The method of claim 1, wherein the EVPN comprises an EVPN overlay with Virtual Extensible Local Area Network (VXLAN) encapsulation over an Internet Protocol (IP) underlay network that uses a global Virtual Network Identifier (VNI), and wherein sending the MAC route advertisement comprises sending, by the first PE router to the remote PE router, the global VNI included in the MAC route advertisement.

3. The method of claim 2, further comprising suppressing, by the second PE router, transmission of a per-EVPN instance (EVI) AD route advertisement to the remote PE router.

4. The method of claim 2, further comprising, based on the per-ES AD route advertisement indicating that the second PE router supports aliasing for the multi-homed ES, receiving, by the second PE router from the remote PE router according to an Equal Cost Multipath (ECMP) next hop built using the global VNI, data packets destined for the MAC address associated with the CE router.

5. The method of claim 1, wherein the EVPN comprises one of an EVPN overlay with Virtual Extensible Local Area Network (VXLAN) encapsulation over an Internet Protocol (IP) underlay network that uses local Virtual Network Identifiers (VNIs) or a Multi-Protocol Label Switching (MPLS) based EVPN, the method further comprising:
based on the second PE router supporting aliasing for the multi-homed ES, sending, by the second PE router to the remote PE router, a per-EVPN instance (EVI) AD route advertisement indicating one of the local VNI or a MPLS aliasing label; and
receiving, by the second PE router from the remote PE router according to an Equal Cost Multipath (ECMP) next hop built using the one of the local VNI or the MPLS aliasing label, data packets destined for the MAC address associated with the CE router.

6. The method of claim 1, wherein the per-ES AD route advertisement sent by the second PE router includes an Ethernet Segment Identifier (ESI) Label Extended Community with an aliasing bit, wherein the aliasing bit being set indicates that the second PE router supports aliasing for the multi-homed ES, and the aliasing bit being reset indicates that the second PE router does not support aliasing for the multi-homed ES.

7. The method of claim 1, wherein sending the per-ES AD route advertisement comprises sending, by at least the first PE router and the second PE router to the remote PE router, a per-ES AD route advertisement indicating whether the respective PE router supports aliasing for the multi-homed ES.

8. The method of claim 1, wherein sending the per-ES AD route advertisement comprises sending, by each of the two or more PE routers on the multi-homed ES to the remote PE router, a per-ES AD route advertisement indicating whether the respective PE router supports aliasing for the multi-homed ES.

9. A system comprising:
two or more provider edge (PE) routers included in an Ethernet virtual private network (EVPN) established between a first site and a second site of a multi-tenant data center, the two or more PE routers connected to a customer edge (CE) router of the first site on a multi-homed Ethernet segment (ES) in an all-active mode;
a first PE router of the two or more PE routers on the multi-homed ES configured to receive, from the CE router, a packet with a media access control (MAC) address associated with the CE router, and send, to at least one remote PE router included in the EVPN, a MAC route advertisement including the MAC address associated with the CE router; and
a second PE router of the two or more PE routers on the multi-homed ES configured to send, to the at least one remote PE router, a per-ES auto-discovery (AD) route advertisement indicating whether the second PE router supports aliasing for the multi-homed ES.

10. The system of claim 9, wherein the EVPN comprises an EVPN overlay with Virtual Extensible Local Area Network (VXLAN) encapsulation over an Internet Protocol (IP) underlay network that uses a global Virtual Network Identifier (VNI), and wherein the first PE router is configured to send, to the remote PE router, the global VNI included in the MAC route advertisement.

11. The system of claim 10, wherein the second PE router is configured to suppress transmission of a per-EVPN instance (EVI) AD route advertisement to the remote PE router.

12. The system of claim 10, wherein the remote PE router is configured to, based on the per-ES AD route advertisement indicating that the second PE router supports aliasing for the multi-homed ES, receive, from the remote PE router according to an Equal Cost Multipath (ECMP) next hop built using the global VNI, data packets destined for the MAC address associated with the CE router.

13. The system of claim 9, wherein the EVPN comprises one of an EVPN overlay with Virtual Extensible Local Area Network (VXLAN) encapsulation over an Internet Protocol (IP) underlay network that uses local Virtual Network Identifiers (VNIs) or a Multi-Protocol Label Switching (MPLS) based EVPN, wherein the second PE is configured to:
based on the second PE router supporting aliasing for the multi-homed ES, send, to the remote PE router, a per-EVPN instance (EVI) AD route advertisement indicating one of the local VNI or a MPLS aliasing label; and
receive, from the remote PE router according to an Equal Cost Multipath (ECMP) next hop built using the one of the local VNI or the MPLS aliasing label, data packets destined for the MAC address associated with the CE router.

14. The system of claim 9, wherein the per-ES AD route advertisement sent by the second PE router includes an Ethernet Segment Identifier (ESI) Label Extended Community with an aliasing bit, wherein the aliasing bit being set indicates that the second PE router supports aliasing for the multi-homed ES, and the aliasing bit being reset indicates that the second PE router does not support aliasing for the multi-homed ES.

15. The system of claim 9, wherein each of the first PE router and the second PE router are configured to send, to the remote PE router, a per-ES AD route advertisement indicating whether the respective PE router supports aliasing for the multi-homed ES.

16. The system of claim 9, wherein each of the two or more PE routers on the multi-homed ES are configured to send, to the remote PE router, a per-ES AD route advertisement indicating whether the respective PE router supports aliasing for the multi-homed ES.

17. A method comprising:
establishing, between a first site and a second site of a multi-tenant data center, an Ethernet virtual private network (EVPN) including two or more provider edge (PE) routers connected to a customer edge (CE) router of the first site on a multi-homed Ethernet segment (ES) in an all-active mode, and at least one remote PE router;
receiving, by the remote PE router from a first PE router of the two or more PE routers on the multi-homed ES, a media access control (MAC) route advertisement including a MAC address associated with the CE router;
receiving, by the remote PE router from at least a second PE router of the two or more PE routers on the multi-homed ES, a per-ES auto-discovery (AD) route advertisement indicating whether the second PE router supports aliasing for the multi-homed ES; and
based on the per-ES AD route advertisement indicating that the second PE router supports aliasing for the multi-homed ES, building, by the remote PE router, an equal-cost multi-path (ECMP) next hop to at least the first and second PE routers on the multi-homed ES to reach the MAC address associated with the CE router over the multi-homed ES.

18. The method of claim 17, wherein the EVPN comprises an EVPN overlay with Virtual Extensible Local Area Network (VXLAN) encapsulation over an Internet Protocol (IP) underlay network that uses a global Virtual Network Identifier (VNI), the method further comprising:
receiving the global VNI included in the MAC route advertisement from the first PE router; and
building the ECMP next hop to at least the first and second PE routers on the multi-homed ES using the global VNI.

19. The method of claim 17, wherein the EVPN comprises one of an EVPN overlay with Virtual Extensible Local Area Network (VXLAN) encapsulation over an Internet Protocol (IP) underlay network that uses local Virtual Network Identifiers (VNIs) or a Multi-Protocol Label Switching (MPLS) based EVPN, the method further comprising:
receiving, by the remote PE router from the second PE router, a per-EVPN instance (EVI) AD route advertisement indicating one of the local VNI or an MPLS aliasing label; and
building the ECMP next hop to at least the first and second PE routers on the multi-homed ES using the one of the local VNI or the MPLS aliasing label.

20. The method of claim 17, wherein the per-ES AD route advertisement from the second PE router includes an Ethernet Segment Identifier (ESI) Label Extended Community with an aliasing bit, wherein the aliasing bit being set indicates that the second PE router supports aliasing for the multi-homed ES, and the aliasing bit being reset indicates that the second PE router does not support aliasing for the multi-homed ES.

21. The method of claim 17, wherein receiving the per-ES AD route advertisement comprises receiving, by the remote PE router from each of at least the first PE router and the second PE router, a per-ES AD route advertisement indicating whether the respective PE router supports aliasing for the multi-homed ES.

22. The method of claim 17, further comprising:
receiving, by the remote PE router from the second PE router, a per-ES AD route advertisement update indicating that the second PE router does not support aliasing for the multi-homed ES; and
withdrawing the second PE router from the ECMP next hop for the MAC address associated with the CE router.

23. A router comprising:
a routing engine configured to:
establish an Ethernet virtual private network (EVPN) between a first site and a second site of a multi-tenant data center, the EVPN including two or more provider edge (PE) routers connected to a customer edge (CE) router of the first site on a multi-homed Ethernet segment (ES) in an all-active mode, wherein the router is a remote PE router included in the EVPN,
receive, from a first PE router of the two or more PE routers on the multi-homed ES, a media access control (MAC) route advertisement including a MAC address associated with the CE router,
receive, from at least a second PE router of the two or more PE routers on the multi-homed ES, a per-ES auto-discovery (AD) route advertisement indicating whether the second PE router supports aliasing for the multi-homed ES, and
based on the per-ES AD route advertisement indicating that the second PE supports aliasing for the multi-homed ES, build an equal-cost multi-path (ECMP) next hop to at least the first and second PE routers on the multi-homed ES to reach the MAC address associated with the CE router over the multi-homed ES; and
a forwarding engine configured to forward data packets destined for the MAC address associated with the CE router according to the ECMP next hop.

24. The router of claim 23, wherein the EVPN comprises an EVPN overlay with Virtual Extensible Local Area Network (VXLAN) encapsulation over an Internet Protocol (IP) underlay network that uses a global Virtual Network Identifier (VNI), and wherein the routing engine is further configured to:
receive the global VNI included in the MAC route advertisement from the first PE router; and
build the ECMP next hop to at least the first and second PE routers on the multi-homed ES using the global VNI.

25. The router of claim 23, wherein the EVPN comprises one of an EVPN overlay with Virtual Extensible Local Area Network (VXLAN) encapsulation over an Internet Protocol (IP) underlay network that uses local Virtual Network Identifiers (VNIs) or a Multi-Protocol Label Switching (MPLS) based EVPN, and wherein the routing engine is further configured to:
receive, from the second PE router, a per-EVPN instance (EVI) AD route advertisement indicating one of the local VNI or an MPLS aliasing label; and
build the ECMP next hop to at least the first and second PE routers on the multi-homed ES using the one of the local VNI or the MPLS aliasing label.

26. The router of claim 23, wherein the per-ES AD route advertisement from the second PE router includes an Ethernet Segment Identifier (ESI) Label Extended Community with an aliasing bit, wherein the aliasing bit being set indicates that the second PE router supports aliasing for the multi-homed ES, and the aliasing bit being reset indicates that the second PE router does not support aliasing for the multi-homed ES.

27. The router of claim 23, wherein the routing engine is further configured to receive, from each of at least the first PE router and the second PE router, a per-ES AD route advertisement indicating whether the respective PE router supports aliasing for the multi-homed ES.

28. The router of claim 23, wherein the routing engine is further configured to:
receive, from the second PE router, a per-ES AD route advertisement update indicating that the second PE router does not support aliasing for the multi-homed ES; and
withdraw the second PE router from the ECMP next hop for the MAC address associated with the CE router.

29. A method comprising:
establishing, between a first site and a second site of a multi-tenant data center, a layer two virtual private network (L2 VPN) between two or more provider edge (PE) routers and at least one remote PE router, wherein the two or more PE routers are connected to a customer edge (CE) router of the first site by a multi-homed L2 network segment associated with a particular customer, and wherein the two or more PE routers are configured to operate in an all-active mode in which all of the PE routers forward L2 traffic from the at least one remote PE to the CE router over the multi-homed L2 network segment;

receiving, by a first PE router of the two or more PE routers and from the CE router, a packet with an L2 address associated with the CE router;

sending, by the first PE router to the at least one remote PE router, a route advertisement including the L2 address associated with the CE router;

sending, by at least a second PE router of the two or more PE routers to the at least one remote PE router using a routing protocol, an auto-discovery (AD) route advertisement associated with the multi-homed L2 network segment indicating whether the second PE router supports aliasing for the multi-homed L2 network segment to reach the L2 address associated with the CE router without having learned the L2 address over the multi-homed L2 network segment; and when the L2 VPN uses a global identifier, suppressing, by the second PE router, transmission of another AD route advertisement associated with a VPN instance of the L2 VPN.

30. The method of claim 29, wherein the L2 VPN comprises an Ethernet virtual private network (EVPN) and the multi-homed L2 network segment comprises a multi-homed Ethernet segment (ES), and wherein the AD route advertisement associated with the multi-homed L2 network segment comprises a per-ES auto-discovery (AD) route advertisement that includes an Ethernet Segment Identifier (ESI) Label Extended Community with an aliasing bit, wherein the aliasing bit being set indicates that the second PE router supports aliasing for the multi-homed ES, and the aliasing bit being reset indicates that the second PE router does not support aliasing for the multi-homed ES.

* * * * *